United States Patent [19]

von der Heide

[11] Patent Number: 4,644,657
[45] Date of Patent: Feb. 24, 1987

[54] SPEED-CONTROLLED APPARATUS FOR CUTTING AND TAKING OUT BLOCKS FROM A SILO FODDER BIN

[76] Inventor: Hans von der Heide, Ibbenbürener Strasse 17, 4533 Laggenbeck, Fed. Rep. of Germany

[21] Appl. No.: 777,002

[22] Filed: Sep. 17, 1985

Related U.S. Application Data

[63] Continuation of Ser. No. 550,739, Nov. 14, 1983, abandoned.

[30] Foreign Application Priority Data

Nov. 11, 1982 [DE] Fed. Rep. of Germany ....... 3241633

[51] Int. Cl.$^4$ ............................................... B23D 49/02
[52] U.S. Cl. .................................... 30/379.5; 83/639; 83/928; 91/450; 241/101.7
[58] Field of Search ................. 30/379.5, 379; 83/639, 83/925, 747; 91/449, 450; 241/30, 101.7

[56] References Cited

U.S. PATENT DOCUMENTS 1,698,942  1/1929  Davis ................................ 91/450 X
2,243,364  5/1941  Trautman ......................... 91/449 X
4,336,732  6/1982  Liet et al. ......................... 30/379 X

FOREIGN PATENT DOCUMENTS 2307689  7/1976  Fed. Rep. of Germany .

Primary Examiner—Douglas D. Watts
Attorney, Agent, or Firm—Felfe & Lynch

[57] ABSTRACT

Apparatus for cutting out blocks from a silo fodder bin has an hydraulically-driven, blade-carrying travelling gear travelling to and fro across a bridge and a conduit between hydraulic feed and return lines thereto such that the fluid flow through said conduit varies the speed of movement of the travelling gear.

1 Claim, 4 Drawing Figures

SPEED-CONTROLLED APPARATUS FOR CUTTING AND TAKING OUT BLOCKS FROM A SILO FODDER BIN

This application is a continuation of application Ser. No. 550,739, filed Nov. 14, 1983 and abandoned herewith.

The present invention relates to an hydraulic speed control particularly for apparatus for cutting out blocks to be taken from a silo fodder bin.

Apparatus for cutting out and taking out blocks from a silo fodder bin, which is adapted particularly to be mounted on a tractor, is known from German Pat. No. 2,307,689. It has an hydraulically-driven travelling gear for moving a cutting blade attached thereto reversably along a supporting U-shaped bridge to cut out the blocks. As described therein for defining the same herein, the travelling gear is an hydraulic motor having a gear engaging gear segments along the bridge for advancing the travelling gear and attached cutting blade therealong.

A drawback for some users, however, resides in that the speed of traversing the bridge depends on the drive of the hydraulic pump for producing the hydraulic fluid flow for actuating the travelling gear. If this pump drive is controlled, the traversing speed of the travelling gear may be set. If the pump is coupled to the prime mover of a tractor, for example, the speed can be controlled only via the speed of rotation of the tractor's engine. In either instance, ideal setting of the desired cutting speed is not readily possible; however, such setting would be advantageous for the cutting of various silo materials.

Accordingly, it is the object of the present invention to provide an apparatus for cutting out blocks to be taken from a silo fodder bin which is free from the above-indicated drawbacks by setting, irrespective of the drive of the pump producing the hydraulic fluid flow, the cutting speed of the cutting blade via the speed of travel of the travelling gear.

In the apparatus as outlined above, according to the present invention, this object is achieved in that hydraulic feed and return lines to an hydraulically-driven travelling gear also communicate with each other through another conduit, and that the fluid flow through said conduit is controllable for thereby varying the speed of movement of the travelling gear.

Advantageously, control of the fluid flow through the conduit may vary the flow cross section of the conduit. Such variation may be effected by screwing a bolt to a greater or lesser depth across the conduit with a handwheel, i.e. a knurled screw.

Below, an exemplary embodiment of the present invention is explained in greater detail by referring to drawings, wherein.

Figure 1:
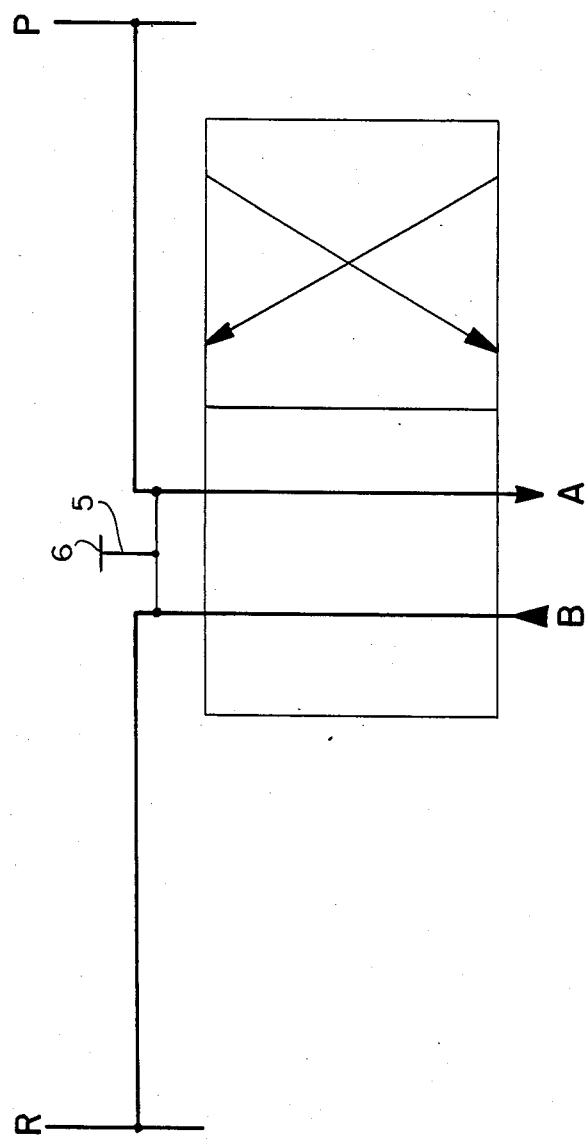
FIG. 1 is a hydraulic diagram of the system for driving the travelling gear of the cutting blade.

As shown in FIG. 1, an hydraulic pump (not shown) provides pressurized hydraulic fluid flow from P to R. The feed line to the travelling gear 16 (FIG. 4) is indicated at A, and the return line therefrom is shown at B. A control element 9 disposed within a housing 4 (better seen in FIG. 2) permits the feed and return flows to be reversed such that the travelling gear may move in forward and rearward directions. This reversal takes place automatically by abutment against stops 17 (only one shown in FIG. 4) each time the U-shaped bridge 15 (FIG. 4) supporting the travelling gear is traversed.

Figure 2:
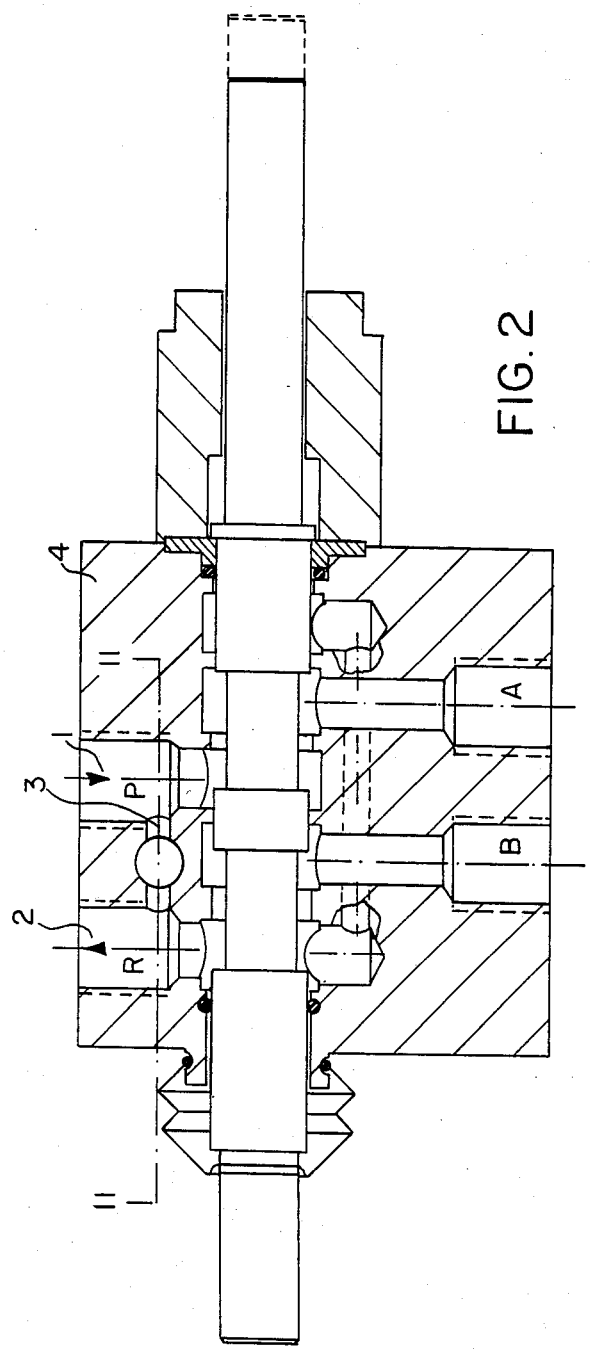
FIG. 2 is a sectional view of the housing of the control element for controlling the travelling gear.

As shown in FIG. 2, the control element 9 in housing 4 for the travelling gear 16 is a piston which, in its position as shown, permits the fluid to flow from P to A and back from B to R. When the piston is moved to the right and to the position shown in dashed lines by stop 17 (FIG. 4), the flow direction is reversed, whereby the hydraulic motor of the travelling gear 16 is reversed in its direction of rotation. After another traverse across the bridge, the piston is then returned to its illustrated position, and the travelling gear starts a further traversing cycle.

Figure 3:
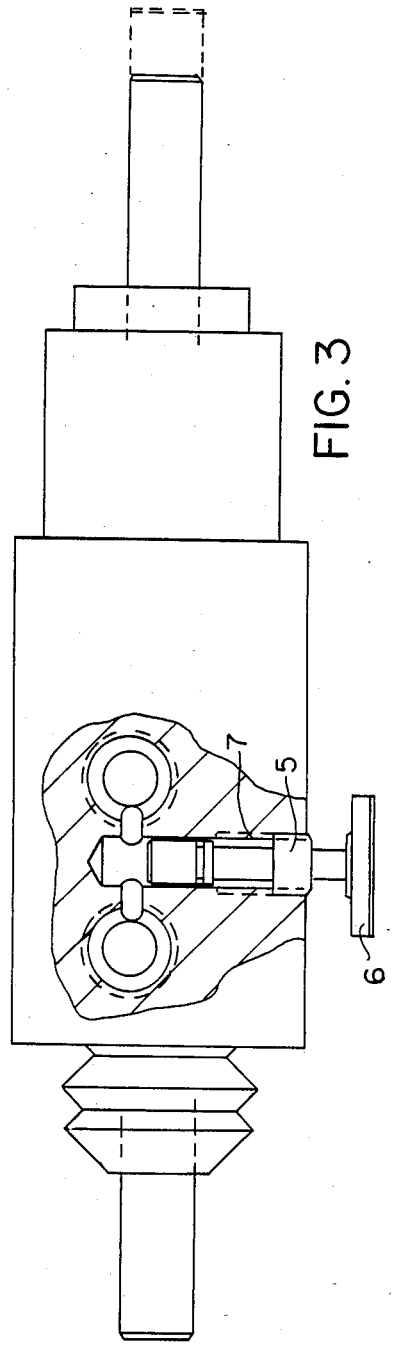
FIG. 3 is an elevational view of the housing, partly in section along lines II—II of FIG. 2.

Hydraulic fluid feed and return lines P(A) and R(B) also communicate with each other through a bored conduit 3. The flow cross-section of the conduit 3 may be set or controlled by a bolt 5 which is adjustable via threads 7 and a handwheel 6, i.e. a knurled screw. During such adjustment, the end of the bolt remote from the handwheel moves to fully block the conduit 3 in its extreme position. In this position, the travelling gear moves at minimum speed whereas, in the position shown in FIG. 3, it moves at top speed since the conduit 3 is completely opened in this instance. Variation of the speed between the maximum and minimum speeds can thus be effected by rotating the bolt 5 by means by handwheel 6 into the bore to a greater or lesser extent thereby varying the flow cross section of conduit 3. In order to preclude a leakage oil flow, the flow-controlling end of the bolt 5 has a diameter equal to the (inner) diameter of the threaded bore in its smooth, unthreaded portion remote from handhwheel 6 and carries a sealing ring (not shown).

Figure 4:
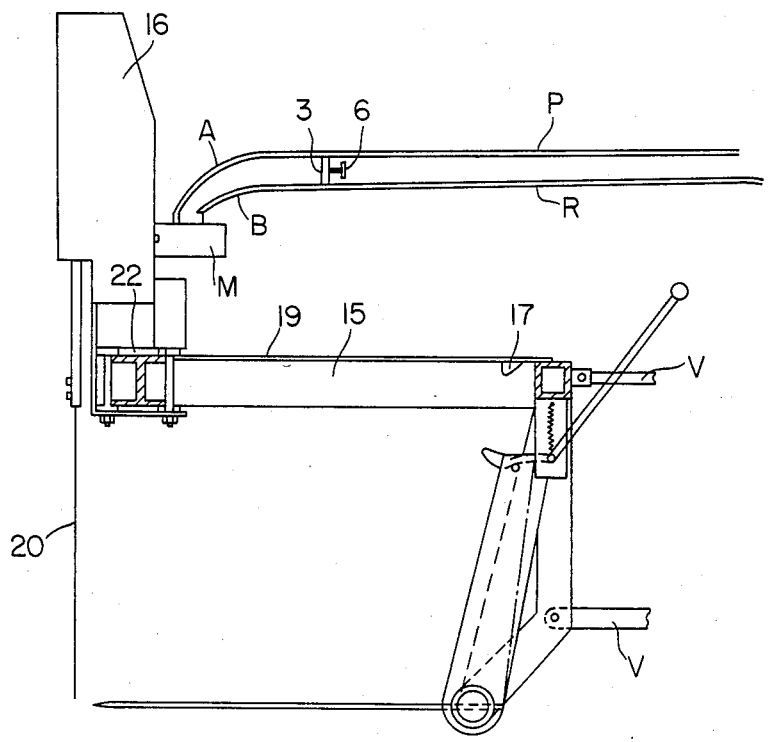
FIG. 4 is an elevation, partly in section, of apparatus for use of the control element of FIGS. 2 and 3.

As for the rest, the apparatus for cutting and taking out blocks from a silo fodder bin as such, and the reversing means or the control element employed are well known from the above-identified patent, for example; therefore, a detailed description may be omitted. However, FIG. 4 shows the travelling gear 16 carrying a cutting blade 20 and having an hydraulic motor M for driving a gear 22 along gear segments 19 on a U-shaped bridge 15 to cut blocks with blade 20.

According to the present invention, therefore, it is possible in a most ready manner to provide for speed control of the cutting operation independently of the pump drive; therefore, it may be spoken of an ideal solution to the existing problems. It should be noted in this connection that the actual cutting movement of the cutting blade may be made dependent of the speed of travel or traverse of the travelling gear, such that the relative speed of the cutting blade with respect to the material to be cut may be also set in addition to the advance speed of the cutting blade; in this way, an optimum speed may be set for every material to be cut.

I claim:

1. Apparatus for cutting material comprising a U-shaped support means to which is attached a cutting means, said cutting means comprising a hydraulic motor which drives a travelling gear, said travelling gear supporting thereon a cutting blade, said motor connected to said travelling gear by feed and return means which control flow of hydraulic fluid to said travelling gear, and a control means which connects said feed and return means, said control means adopted to control speed of said travelling gear on said U-shaped bridge by varying the flow cross-section of hydraulic fluid conduit, said control means comprising a bolt threaded into the conduit for varying said flow cross-section by rotation, and a handwheel on the bolt for its rotation.

* * * * *